US008724816B2

(12) United States Patent
Shi et al.

(10) Patent No.: US 8,724,816 B2
(45) Date of Patent: May 13, 2014

(54) SECURITY SERVICE CONTROL METHOD AND WIRELESS LOCAL AREA NETWORK TERMINAL

(75) Inventors: Yuanqing Shi, Shenzhen (CN); Jiehui Liang, Shenzhen (CN); Wangxing Kang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 92 days.

(21) Appl. No.: 13/259,023

(22) PCT Filed: Dec. 16, 2009

(86) PCT No.: PCT/CN2009/075648
§ 371 (c)(1),
(2), (4) Date: Dec. 28, 2011

(87) PCT Pub. No.: WO2010/145138
PCT Pub. Date: Dec. 23, 2010

(65) Prior Publication Data
US 2012/0096263 A1    Apr. 19, 2012

(30) Foreign Application Priority Data
Jun. 30, 2009 (CN) .......................... 2009 1 0150756

(51) Int. Cl.
*H04L 29/06* (2006.01)
(52) U.S. Cl.
USPC ................................ 380/270; 713/168; 726/3
(58) Field of Classification Search
USPC .......................................................... 380/270
See application file for complete search history.

(56) References Cited

U.S. PATENT DOCUMENTS

| 7,762,470 | B2* | 7/2010 | Finn et al. ...................... 235/492 |
| 2003/0200455 | A1* | 10/2003 | Wu .................. 713/200 |
| 2007/0053508 | A1* | 3/2007 | Yasumoto ........................ 380/28 |
| 2008/0295144 | A1* | 11/2008 | Cam-Winget et al. ............ 726/1 |
| 2008/0298312 | A1* | 12/2008 | Zhang et al. .................. 370/328 |
| 2009/0022152 | A1* | 1/2009 | Henry et al. .................. 370/389 |

FOREIGN PATENT DOCUMENTS

| CN | 1681239 A | 10/2005 |
| CN | 101600203 A | 12/2009 |

OTHER PUBLICATIONS

Li et al., "On the Security of the Authentication Module of Chinese WLAN Standard Implementation Plan", pp. 340-348, ACNS 2006.*
"Wireless VPN Technology", "CWSP study guide", Osborne, 2003.*
International Search Report in international application No. PCT/CN2009/075648, mailed on Apr. 8, 2010.
English Translation of the Written Opinion of the International Search Authority in international application number: PCT/CN2009/075648, mailed on Apr. 8, 2010.

* cited by examiner

*Primary Examiner* — Mohammad L Rahman
(74) *Attorney, Agent, or Firm* — Oppedahl Patent Law Firm LLC (57) ABSTRACT

A security service control method and a WLAN terminal are provided, and the method includes: stopping a WPI service between a WLAN terminal and an AP when the WLAN terminal creates a security service of an IP layer and/or a layer above the IP layer, wherein the WPI service comprises: encrypting a data link layer message to be transmitted, and decrypting a received data link layer message. After the WPI service is stopped, when the WLAN terminal cancels the security service of the IP layer and/or the layer above the IP layer, the WLAN terminal completes processes of removing association, association, user authentication and key negotiation in turn with the WLAN AP, and uses a session key obtained through the key negotiation to recover the WPI service. The calculating resources can be saved by using the present invention.

10 Claims, 8 Drawing Sheets

SECURITY SERVICE CONTROL METHOD AND WIRELESS LOCAL AREA NETWORK TERMINAL

TECHNICAL FIELD

The present invention relates to the technology of security service, in particular to a security service control method and a wireless local area network terminal.

BACKGROUND

To solve security loopholes existed in the Wired Equivalent Privacy (WEP) security mechanism defined in the international standard ISO/IEC 8802-11 for Wireless Local Area Network (WLAN), China issued a national standard for WLAN and a No. 1 revision thereof, i.e. replacing the WEP with Wireless Local Area Network Authentication and Privacy Infrastructure (WAPI), to solve the security problem of the WLAN.

The WAPI consists of WLAN Authentication Infrastructure (WAI) and WLAN Privacy Infrastructure (WPI). The WAI utilizes public key encrypting technique for the mutual identity authentication between a station (STA, or terminal) and a Access Point (AP), while the WPI utilizes the symmetric cryptographic algorithm for WLAN approved by State Encryption Management Commission Office to realize data protection, encrypting and decrypting the MAC Protocol Data Unit (MPDU) of the Media Access Control (MAC) sub-layer.

The infrastructure presented in the WAPI specification comprises three function entities: Authentication Supplicant Entity (ASUE), Authenticator Entity (AE) and Authentication Service Entity (ASE), wherein the ASUE is an entity for requesting authentication before accessing a service;

the AE is an entity for providing the authentication for the ASUE before the ASUE accesses the service; this entity stays in an AP or a terminal; the AP refers to any entity which has station functions and provides an access distribution service to terminals associated with the AE via a wireless network; and the ASE is an entity for providing an identity authentication service for the ASUE and the AE; this entity stays in an Authentication Service Unit (ASU); the basic functions of the ASU comprise the management of user certificate, the authentication of user identity and the like, the ASU is an important part of the WAI based on public key encrypting technique; a node corresponding to the ASU in the network is a WAPI authentication server.

The user certificate is a public key certificate, which is an important link in the WAI system structure. The public key certificate is the digital identity certification of a network user, which is able to identify the network user uniquely through the private key authentication.

Figure 1:
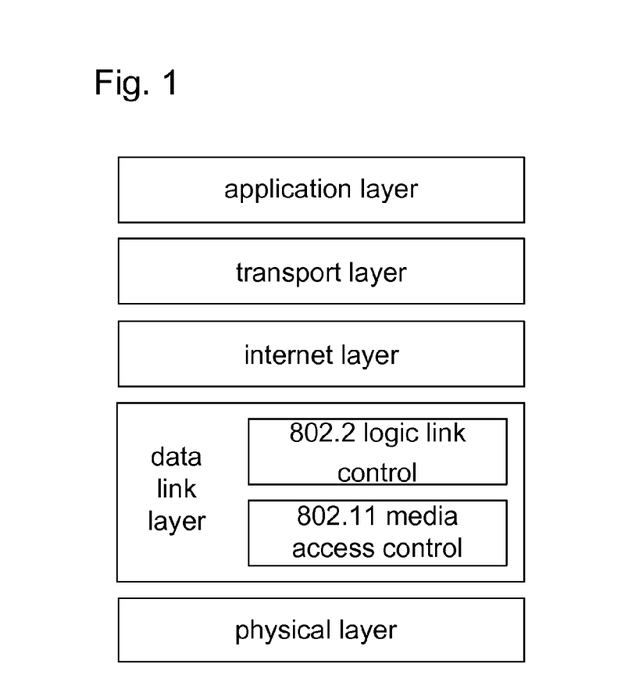
FIG. 1 shows the location of 802.11 media access control and the 802.2 logic link control in the TCP/IP hierarchical model.

After the terminal which supports the WAPI function completes the WAI authentication, it accesses a wired packet network via a WLAN air interface link, and then the terminal and the AP which supports the WAPI function complete the encryption and decryption of their respective MPDU by means of the negotiated unicast key and the negotiated symmetric cryptographic algorithm during the WAI process. The network protocol stack at the terminal side is observed by means of Transfer Control Protocol/Internet Protocol (TCP/IP) hierarchical model; 802.11 media access control and the 802.2 logic link control at the upper layer constitute the data link layer, as shown in FIG. 1.

The network applications on the terminal are mostly based on IP packet, and the IP layer has its own security service. Each network application client is able to complete the encryption and integrity protection of communication data with its application server or a client of a user interacting with the network application client by means of the security service of the IP layer. For the data transmitted on the radio access link, on the premise of data security protection of IP layer or a layer above the IP layer (e.g. application layer), the encryption for a MPDU message of data link layer usually cannot further enhance the security of the service data, while consumes a lot of calculating resources.

SUMMARY

The technical problem to be solved by the present invention is to overcome the defects of the prior art and provide a security service control method and a WLAN terminal, so as to save the calculating resources of the terminal in the event that the data security protection service of Internet Protocol (IP) layer or a layer above the IP layer is initiated.

To solve the aforementioned problem, the present invention provides a security service control method, which includes:

a WPI service between a WLAN terminal and an AP is stopped when the WLAN terminal creates a security service of an IP layer and/or a layer above the IP layer, wherein the WPI service comprises: encrypting a data link layer message to be transmitted, and decrypting a received data link layer message.

Furthermore, after the WPI service is stopped, when the WLAN terminal cancels the security service of the IP layer and/or the layer above the IP layer, the WLAN terminal may complete processes of removing association, association, user authentication and key negotiation in turn with the WLAN AP, and may use a session key obtained through the key negotiation to recover the WPI service.

Furthermore, the operation of stopping the WPI service may include:

removing association between the WLAN terminal and the WLAN AP, and performing association between the WLAN terminal and the AP after the removal of the association succeeds;

performing user authentication between the WLAN terminal and the AP after the association succeeds;

returning, by the WLAN terminal, a unicast key negotiation failure response to the AP, after the user authentication is completed and a unicast key negotiation request transmitted by the AP is received by the WLAN terminal; and stopping, by the WLAN terminal and the AP, the encryption and decryption of the data link layer message transmitted between the WLAN terminal and the AP.

Furthermore, only when the application of creating the security service of the IP layer and/or the layer above the IP layer is the application uniquely using WLAN for communication in the WLAN terminal, or besides the application of creating the security service of the IP layer and/or the layer above the IP layer, all other applications using the WLAN for communication in the WLAN terminal have initiated the security service of the IP layer and/or the layer above the IP layer, the WLAN terminal may stop the WPI service.

Furthermore, when a security control module of the WLAN terminal receives a request of creating the security service of the IP layer and/or the layer above the IP layer transmitted by an application layer module of the WLAN terminal, the operation of stopping the WPI service may be executed; and after the WPI service is stopped, the security control module may create and initiate the security service of the IP layer and/or the layer above the IP layer for the application layer module according to the request of creating the security service of the IP layer and/or the layer above the IP layer.

The present invention also provides a WLAN terminal comprising an application layer module, a WAI module and a WPI module; the WLAN terminal further comprises a security control module; wherein the security control module is used for receiving a request of creating a security service of an IP layer and/or a layer above the IP layer transmitted by the application layer module, and stopping a WPI service between the WLAN terminal and a WLAN AP after receiving the request, wherein the WPI service comprises: encrypting a data link layer message to be transmitted, and decrypting a received data link layer message.

Furthermore, the security control module may be further used for transmitting an instruction of stopping the WPI service to the WAI module; and the WAI module may be used for completing processes of removing association, association and user authentication in turn with the WLAN AP after receiving the instruction of stopping the WPI service; and after receiving a unicast key negotiation request transmitted by the AP, returning a unicast key negotiation failure response to the AP and instructing the WPI module to stop encrypting and decrypting the data link layer message so as to stop the WPI service between the WLAN terminal and the AP.

Furthermore, the security control module may be further used for receiving a request of canceling the security service of the IP layer and/or the layer above the IP layer transmitted by the application layer module after the WPI service is stopped, and transmitting an instruction of recovering the WPI service to the WAI module after receiving the request; and the WAI module may be used for completing the processes of removing association, association and user authentication in turn with the WLAN AP after receiving the instruction of recovering the WPI service; performing key negotiation with the AP; and transmitting a session key obtained through the negotiation to the WPI module after the key negotiation is completed.

Furthermore, the security control module may be further used for, after receiving the request of creating the security service of the IP layer and/or the layer above the IP layer, determining whether there is an application layer module in the WLAN terminal using WLAN for communication but not initiating the security service of the IP layer and/or the layer above the IP layer besides the application layer module transmitting the request of creating the security service of the IP layer and/or the layer above the IP layer, and transmitting the instruction of stopping the WPI service only when there is no such application layer module.

Furthermore, the security control module may be further used for, after receiving the request of creating the security service of the IP layer and/or the layer above the IP layer, caching the request and transmitting the instruction of stopping the WPI service;

the WAI module may be further used for notifying the security control module that the WPI service has been stopped after the WPI service is stopped; and the security control module may be further used for creating and initiating the security service of the IP layer and/or the layer above the IP layer for the application layer module according to the cached request after receiving the notification.

Furthermore, the WAI module may be used for instructing the WPI module to stop encrypting and decrypting the data link layer message by transmitting a null key to the WPI module.

To sum up, by stopping the WPI service when the terminal is about to initiate the security service of the IP layer or the layer above the IP layer, the present invention is able to save the calculating resources of the terminal and the AP, which is favorable to run an application with high real time requirements in the terminal.

DETAILED DESCRIPTION

Since after the security service of the IP layer and/or a layer above the IP layer is initiated, the encryption for a MPDU message of the data link layer is not necessary so as to save the calculating resources of the terminal and the AP and be favorable to the application deployment with high real time requirement. The present invention detects the requests of creating/canceling the security service of the IP layer and/or a layer above the IP layer in the WLAN terminal which supports WAPI, and stops the WPI service when the request of creating the security service of the IP layer and/or a layer above the IP layer is detected, or recovers the WPI service when the request of canceling the security service of the IP layer and/or a layer above the IP layer is detected.

The present invention is detailed as follows together with the drawings and embodiment.

Figure 2:
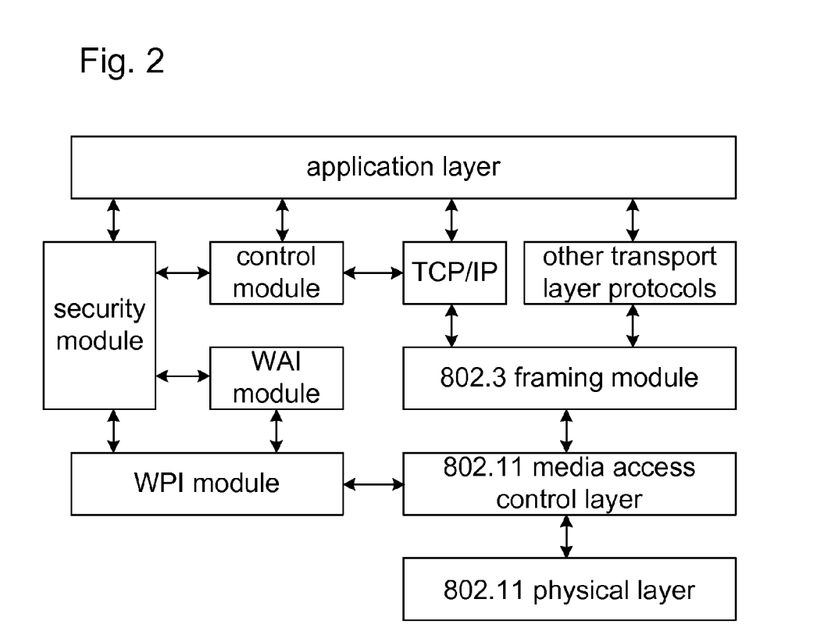
FIG. 2 shows a hierarchy and interface relations among a security module, a control module and other entities of the WLAN terminal according to an embodiment of the present invention.

FIG. 2 shows a hierarchy and interface relations among a new added security module, a control module and other modules/entities of the WLAN terminal according to an embodiment of the present invention. The modules/entities directly related to the present invention in the FIG. 2 include: application layer, TCP/IP layer, security module, control module, WAI module, and WPI module. The aforementioned modules and entities are briefly described in combination with FIG. 2 below.

The application layer is used for providing an application service for a user, including an application service based on WLAN.

The TCP/IP layer is an entity realizing TCP/IP, and is able to create an Internet Protocol Security (IPSec) service for the application layer, provide an interface the application layer for using the IPSec service. Furthermore, the creation and cancelation of the IPSec service is controlled by the control module, thus the TCP/IP layer also provides an interface for creating and canceling the IPSec service for the control module.

The security module provides the application layer with a WAI authentication service interface and a WPI data protection service interface (both are generally called as WAPI service interface), for being called by the application layer to perform data encryption and decryption, signature, and signature authentication. The WAPI service interface specifically includes:

an interface for WAI Hash calculation function and asymmetrical key encryption/decryption function;

an interface for WPI symmetrical key encryption/decryption function and random number generation function; and an interface for storing, acquiring and parsing the digital certificate of the contact and the terminal user.

The control module provides an interface for creating and canceling IPSec to the application layer, for being called by the application layer to create and cancel an IPSec service. Furthermore, the control module further determines whether to cancel or recover the WPI service.

Furthermore, the control module also provides the application layer with an interface for registering security feature information, for the application layer performing registration of the security feature information.

The security feature information includes: that whether the application module/application relies on the data security service provided by the WAPI, i.e. WPI service, and that whether a security service of the IP layer or a layer above the IP layer is initiated and the security service can replace the data security service provided by the WAPI.

The security service of the IP layer or a layer above the IP layer includes: IPSec service (security service running in the IP layer), transport layer security service, application layer security service and the like.

The specific functions and connection relations (message/order interaction relation) of the above modules/entities will be detailed below.

Figure 3:
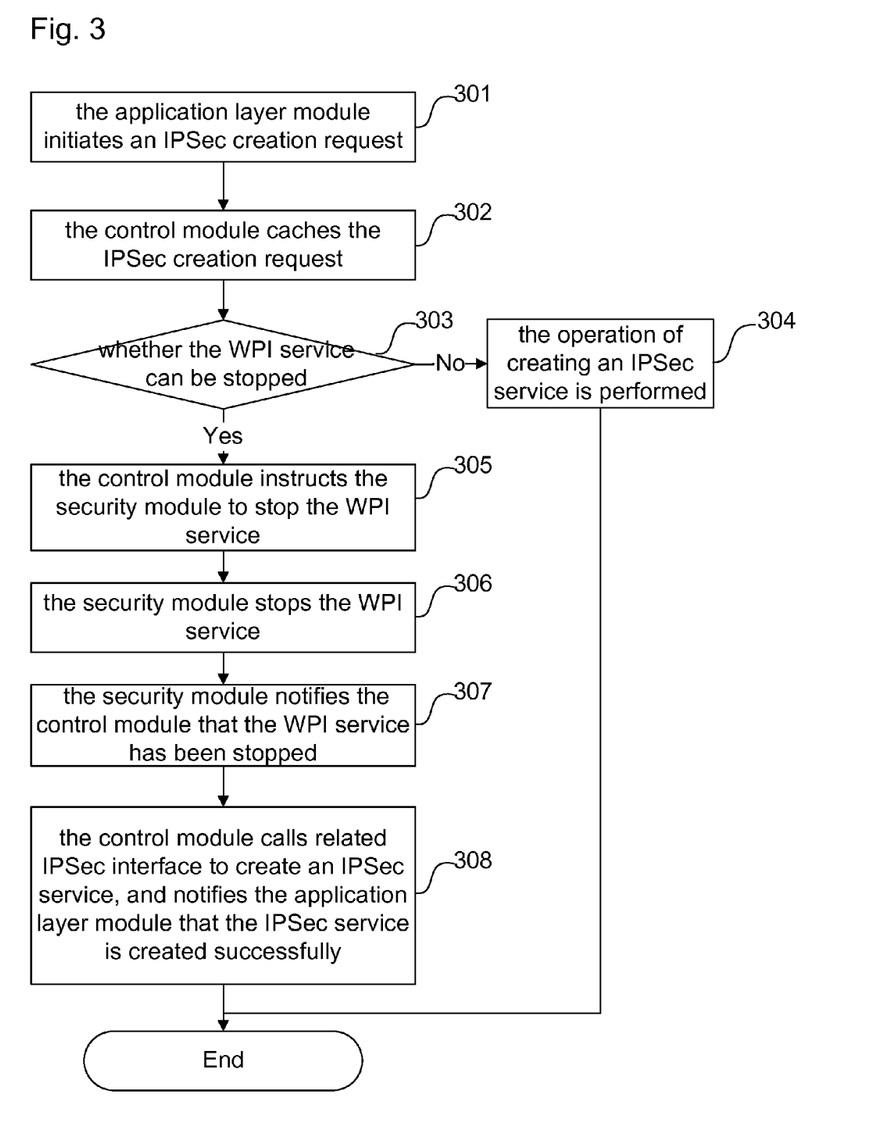
FIG. 3 shows the flow of stopping the WPI service in the WLAN terminal according to the security service control method of the present invention.

FIG. 3 shows the flow of stopping the WPI service in the WLAN terminal according to the security service control method of the present invention. As shown in FIG. 3, the method includes the following steps.

301: the application layer module of the WLAN terminal requests to create an IPSec service, and transmits an IPSec creation request to the control module of the WLAN terminal.

302: the control module caches the request after receiving the IPSec creation request.

Figure 4:
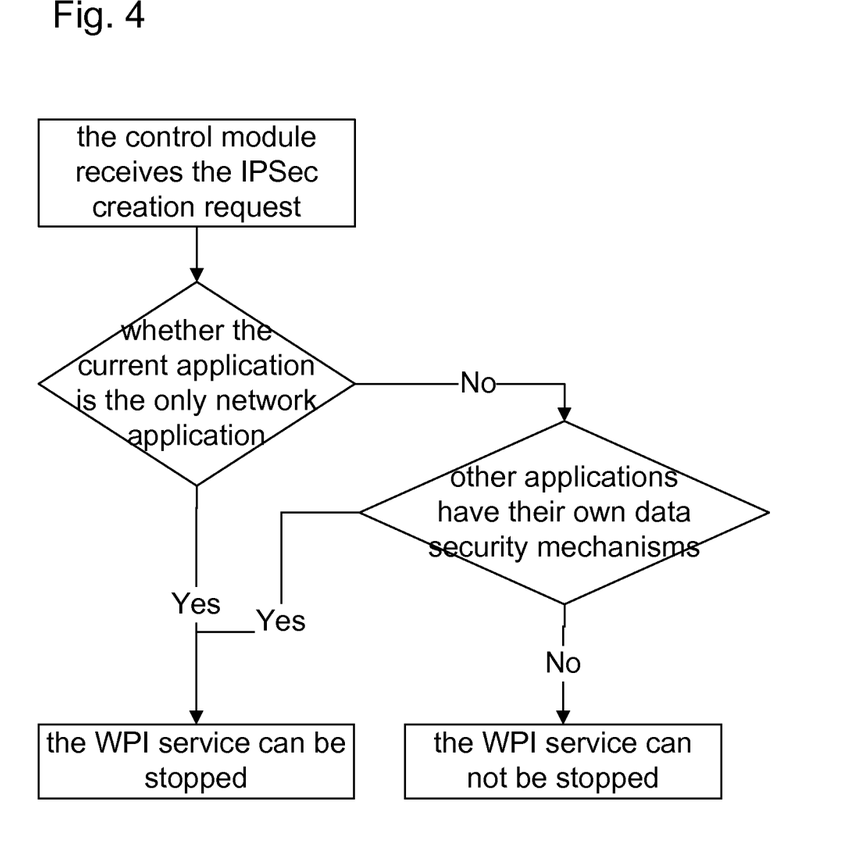
FIG. 4 shows the flow of the control module determining if the WPI service can be stopped according to security feature information.

303: the control module determines whether the WPI service can be stopped at present according to the security feature information registered by all the current application layer modules, if the WPI service cannot be stopped, step 304 will be performed, otherwise step 305 will be preformed. The specific determination flow is shown in FIG. 4, wherein the determination strategy includes:

if the application layer module initiating the IPSec creation request is the only application layer module which uses the WLAN for communication at present, the control module determines that the WPI service can be stopped;

if there are multiple application layer modules using the WLAN for communication at present, besides the application layer module initiating the IPSec creation request, all other application layer modules have initiated the security service (encrypting, scrambling and the like) of the IP layer or a layer above the IP layer, and the security service of the data link layer provided by the WAPI is not needed, the control module determines that the WPI service can be stopped;

if there are multiple application modules using the WLAN for communication at present, except for the application layer module initiating the IPSec creation request at present, there is at least one application layer module which relies on the security service of the data link layer provided by the WAPI, and other security service is not initiated, the control module determines that the WPI service can not be stopped.

304: if the control module determines that the WPI service can not be stopped, the IPSec service creation operation will be performed immediately, after the IPSec service is created successfully, a response comprising success information is returned to the application layer module, and the application layer module can initiate the IPSec service for data transmission protection, and then the flow ends.

305: if the control module determines that the WPI service can be stopped, the control module initiates a WPI service stopping request to the security module to indicate that current wireless link does not need the WPI service.

306: after receiving the WPI service stopping request, the security module stops the WPI service between the terminal and the AP.

Specifically, the security module can perform the following operations to stop the WPI service by controlling the WAI module (e.g. transmitting a WPI service stopping instruction to the WAI module):

306a: removing association between the WAI module of the WLAN terminal and the AP;

306b: after the association is successfully removed, performing association between the WAI module and the AP;

306c: after the association is successfully performed, the WAI module and the AP perform user authentication based on a certificate or a pre-shared key;

306d: after the user authentication process is completed, the AP initiates a unicast key negotiation and transmits a unicast key negotiation request to the WAI module; after receiving the request, the WAI module returns a unicast key negotiation failure response to the WAI module;

306e: the WAI module instructs the WPI module to stop encryption of MPDU;

for example, the WAI module may transmit a null key value (e.g. 0) to the WPI module, after receiving the null key value, the WPI module no longer encrypts the transmitted MPDU, and can also no longer decrypts the received MPDU (the received encrypted MPDU can be discarded directly, and data error will be reported to the transmitting end (i.e. AP)), and then the WPI service is stopped. Of course, the WAI module can also transmit an instruction of stopping encryption and decryption to the WPI module to stop the WPI service;

it should be noted that, for a terminal which has completed the user authentication, after a unicast key negotiation with the terminal fails, the AP allows the access of the terminal and allows its data to be transmitted via a controlled port of the AP, and the AP does not encrypt or decrypt the controlled port based on the symmetric cryptographic algorithm;

306f: the WAI module notifies the security module that the WPI service has been stopped.

307: after stopping the WPI service, the security module transmits a response comprising success information to the control module, notifying the control module that the WPI service has been stopped.

308: after confirming that the WPI service has been stopped successfully, the control module calls related IPSec interface to create an IPSec service; after the IPSec service is created successfully, the security module notifies the application layer module that the IPSec service has been created, the application layer module can initiate the IPSec service to perform data transmission protection, and then the flow ends.

Figure 5:
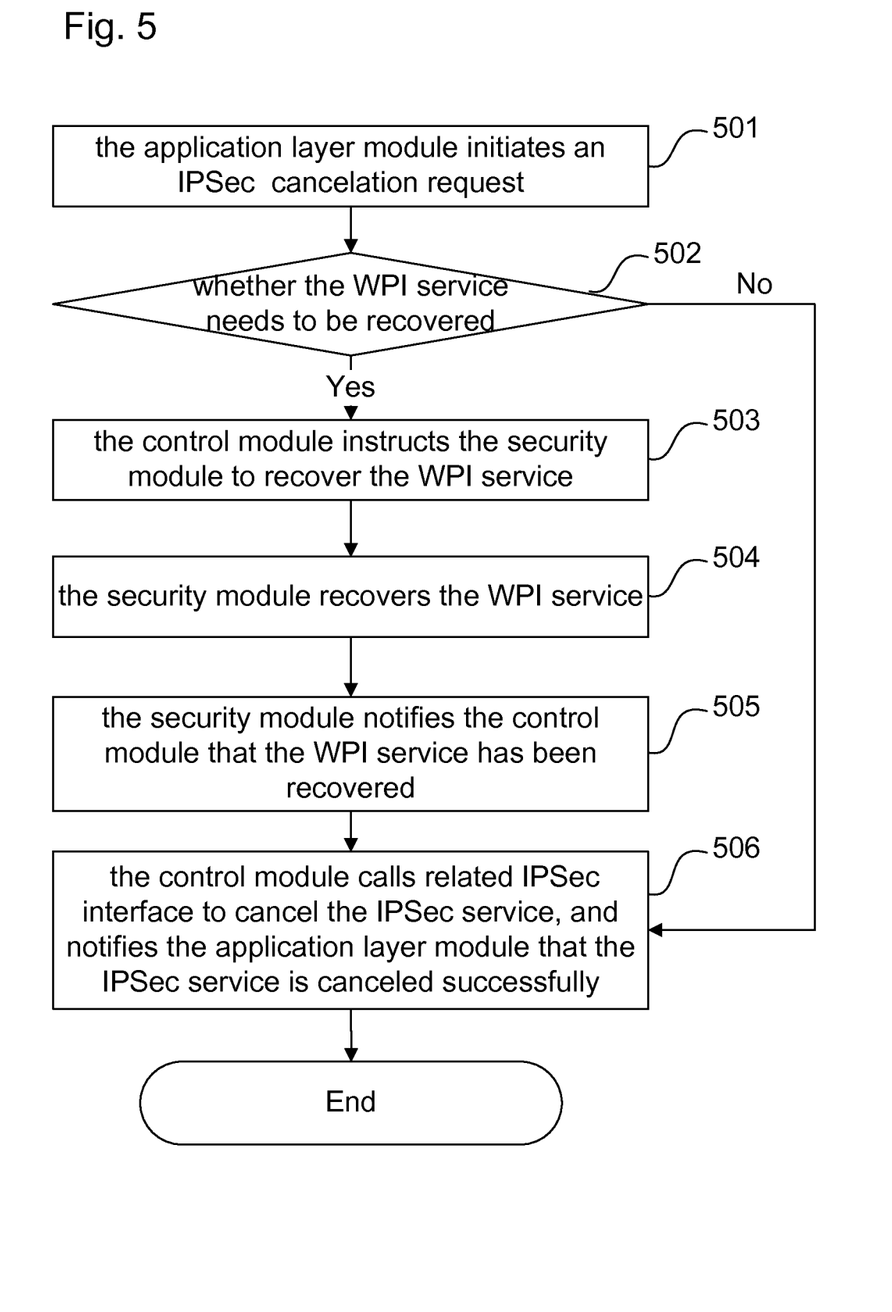
FIG. 5 shows the flow of recovering the WPI service in the WLAN terminal according to the security service control method of the present invention.

FIG. 5 shows the flow of recovering the WPI service in the WLAN terminal according to the security service control method of the present invention. As shown in FIG. 5, the method includes the following steps.

501: when the application layer module of the WLAN terminal cancels an IPSec service actively or receives a notification of canceling the IPSec service transmitted by an opposite end of the network, the application layer module transmits an IPSec cancelation request to the control module.

502: after receiving the IPSec cancelation request, the control module determines whether the WPI service needs to be recovered according to the security feature information registered by all the current application modules, if it does not need to recover the WPI service, step 506 will be performed, otherwise step 503 will be preformed.

Figure 6:
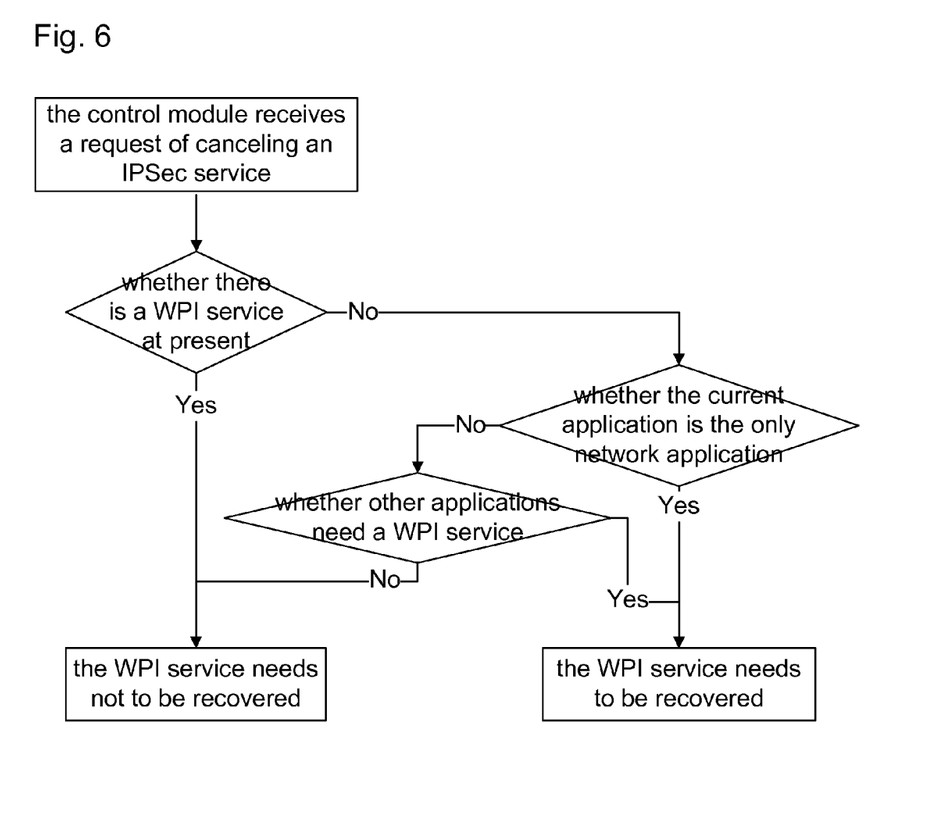
FIG. 6 shows the flow of the control module determining if the WPI service needs to be recovered according to the security feature information.

The specific flow of performing the above determination is shown in FIG. 6, wherein the determination strategy includes:
- if the WPI service has been initiated at present, it does not need to perform the recovering operation;
- if the current application layer module initiating the IPSec cancelation request is the only application layer module which uses the WLAN for communication at present, the control module determines that the WPI service can be recovered, this is because recovering the WPI service in this case will not affect the communication of the application layer module;
- if there are multiple application layer modules using the WLAN for communication at present, except for the application layer module initiating the IPSec cancelation request, all other application layer modules have initiated the security service of the IP layer or a layer above the IP layer to perform data security protection, the control module determines that the WPI service needs not to be recovered, otherwise, the WPI service needs to be recovered.

503: if the control module determines that the WPI service need to be recovered, the control module initiates a WPI service recovering request to the security module to indicate that the current link needs the WPI service.

504: after receiving the WPI service recovering request, the security module recovers the WPI service;

Specifically, the security module can perform the following operations to recover the WPI service by controlling the WAI module (for example, transmitting a WPI service recovering instruction to the WAI module):

504a: removing association between the WAI module and the AP;

504b: after the association is successfully removed, performing association between the WAI module and the AP;

504c: after the association is successfully performed, the WAI module and the AP perform user authentication based on a certificate or a pre-shared key;

504d: after the user authentication process is completed, the AP initiates a unicast key negotiation, and the WAI module completes the unicast session key negotiation with the AP according to a standard flow; wherein after receiving the unicast key negotiation request transmitted by the AP, a unicast key negotiation success response needs to be retuned to the AP; if needed, the WAI module also completes a multicast key negotiation with the AP according to a standard flow after the unicast key negotiation is completed;

504e: after successfully completing the unicast key negotiation and multicast key negotiation, the WAI module transmits a negotiated unicast session key and multicast session key to the WPI module; the WPI module encrypts and decrypts MPDU to be transmitted or received with the unicast session key, and decrypts the received MPDU with the multicast session key;

it should be noted that, the AP allows the data corresponding to the terminal to pass through the controlled port at present, and encrypts and decrypts the MPDU transmitted to the terminal or received from the terminal based on the symmetric cryptographic algorithm;

504f: the WAI module notifies the security module that the WPI service has been recovered.

505: after the WPI service is recovered successfully, the security module transmits a response comprising success information to the control module, notifying the control module that the WPI service has been recovered.

506: the control module calls related IPSec interface to cancel the IPSec service; after the IPSec service is canceled successfully, the security module notifies the application layer module that the IPSec service has been canceled successfully.

It should be noted that, the control module also may first perform the operation of canceling the IPSec service after receiving the IPSec cancelation request transmitted by the application layer module, and then perform the subsequent operations, such as determining whether the WPI service needs to be recovered.

According to the basic principle of the present invention, the aforementioned embodiment may be variable in multiple ways, such as:

1. on the WLAN terminal, the security module and the control module can be integrated into one module, referred to as security control module.

2. in the above embodiment, the control module provides an interface for creating/canceling an IPSec service to the application layer module, so as to know that the application layer module is about to create/cancel the security service of the IP layer after receiving the above-mentioned request, and the control module performs the operation of stopping/recovering the WPI service; in other embodiments of the present invention, the control module may also know when each application layer module will create/cancel the security service of the IP layer through intercepting and detecting the protocol message of the TCP/IP module, and perform the subsequent processes; the method of intercepting and detecting the protocol message of the TCP/IP module does not belong to the scope of the present invention, which can be obtained via related files.

Furthermore, modification may be made directly to the TCP/IP module, so that when receiving a protocol message related to the IPSec service creation and cancelation transmitted by the application layer module or the opposite end of the network, the TCP/IP module notifies the control module, and then performs subsequent processes after receiving the further instruction of the control module.

3. Besides that the WPI service can be stopped after the security service of the application layer and the security service of the IP layer is created or initiated, the WPI service can be stopped by the method of the present invention after any security service over the IP layer is created and initiated, such as Secure Socket Layer (SSL) service, Transport Layer Security (TLS) service, Secure Shell (SSH) service, socket security (SOCKS) service etc., to protect the service (application) data.

Also, the control module may know when each function entity creates/cancels corresponding security service through intercepting and detecting the protocol message of the corresponding function entity (e.g. SSL function entity, TLS function entity, etc.), and performs the subsequent processes. Also, modification may be made directly to the codes of each function entity, so that when creating/canceling a security service, each function entity notifies the control module, and then performs the subsequent processes after receiving the further instruction of the control module.

4. Besides the method for stopping the WPI service described in the above-mentioned embodiment of the present invention, other methods can also be adopted to stop the WPI service. For example, the security module directly transmits an instruction of stopping the service to the WPI module, the WPI module stops the encryption of the MPDU transmitted by the WPI module (but still needs to decrypt the received MPDU, or discards the encrypted MPDU) after receiving the instruction, and adds a plaintext transmission identity to the WPI header of a MPDU so as to indicate that the MPDU is not encrypted; in this case, the AP needs to support corresponding functions, i.e. determining whether the MPDU is encrypted by detecting the WPI header, if the MPDU is not encrypted, the AP will not perform the decryption of the MPDU. Thereafter, the AP may also not encrypt the MPDU transmitted to the terminal, and add a plaintext transmission identity to the WPI header of the MPDU so as to indicate that the MPDU is not encrypted.

Figure 7:
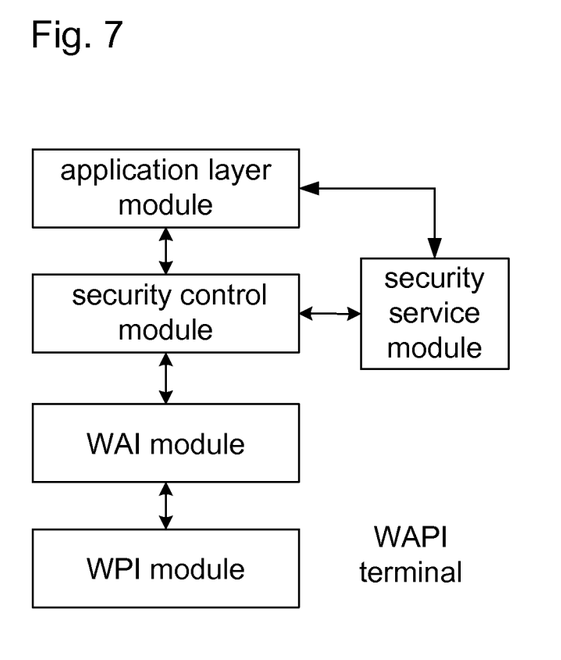
FIG. 7 shows the structure of the WLAN terminal according to an embodiment of the present invention.

FIG. 7 shows the structure of the WLAN terminal according to an embodiment of the present invention. In FIG. 7, the security module and the control module shown in FIG. 2 are integrated into a security control module, and function entities which are not directly related to the present invention are omitted. As shown in FIG. 7, the terminal comprises: application layer module, security control module, WAI module, WPI module and security service module; wherein the security control module is used for receiving a request of creating a security service of the IP layer and/or a layer above the IP layer transmitted by the application layer module, and transmitting an instruction of stopping a WPI service to the WAI module after receiving the request;

the WAI module is used for interacting with a WLAN AP and completing the processes of removing association, association and user authentication in turn after receiving the instruction of stopping the WPI service, returning a unicast key negotiation failure response to the AP after receiving a unicast key negotiation request transmitted by the AP, and instructing the WPI module to stop encrypting and decrypting a data link layer message so as to stop the WPI service between the WLAN terminal and the AP.

Furthermore, the security control module also receives a request of canceling the security service of the IP layer and/or a layer above the IP layer transmitted by the application layer module after the WPI service is stopped, and transmits an instruction of recovering the WPI service to the WAI module after receiving the request; and the WAI module interacts with the AP and completes the processes of removing association, association and user authentication in turn after receiving the instruction of recovering the WPI service, performs a key negotiation with the AP, and transmits a session key obtained by the negotiation to the WPI module to recover the WPI service after the key negotiation is completed.

Besides, as mentioned above, the security control module also provides the application layer module with an interface for registering security feature information, for the application layer performing the registration of the security feature information. The security feature information includes: that whether the application module/application relies on the data security service provided by the WAPI, i.e. WPI service; and that whether there is a security service of the IP layer or a layer above the IP layer which can replace the data security service provided by the WAPI.

Furthermore, after receiving the request of creating the security service of the IP layer and/or a layer above the IP layer, the security control module determines according to the registered security feature information, besides the application layer module transmitting the request of creating the security service of the IP layer and/or a layer above the IP layer, whether there is an application layer module in the WLAN terminal which uses the WLAN for communication but not initiates the security service of the IP layer and/or a layer above the IP layer, and transmits the instruction of stopping the WPI service only when there is no such application layer module.

The security service module in FIG. 7 may be an IPSec service module. The security service module is connected to the application layer module and provides the security service (encrypting, decrypting, scrambling, descrambling, etc.) to the application layer module after a security service is successfully created. The security service module is connected to the security control module, receives a connecting instruction of creating/canceling the security service transmitted by the security control module, and creates or cancels the security service for the application layer module according to the instruction.

Of course, the security service module may also be existed in other function entities (for example, the TCP/IP layer in FIG. 2), but is not arranged in a terminal in the form of individual function module.

The above description refers to the function modules in the WLAN terminal related to the control of a security service, and the specific realizing method may refer to FIG. 3 and FIG. 5. The following concerns the WAPI service interface provided by the security control module of the present invention to the application layer and the specific realizing method.

One skilled in the relevant art is aware of the kinds of structure which may be employed to perform the functions of the modules of FIG. 7. Inherently set forth herein is that such structure may comprise suitable instructions stored in a suitable memory, executed by a suitable processor or microcontroller.

Figure 8:
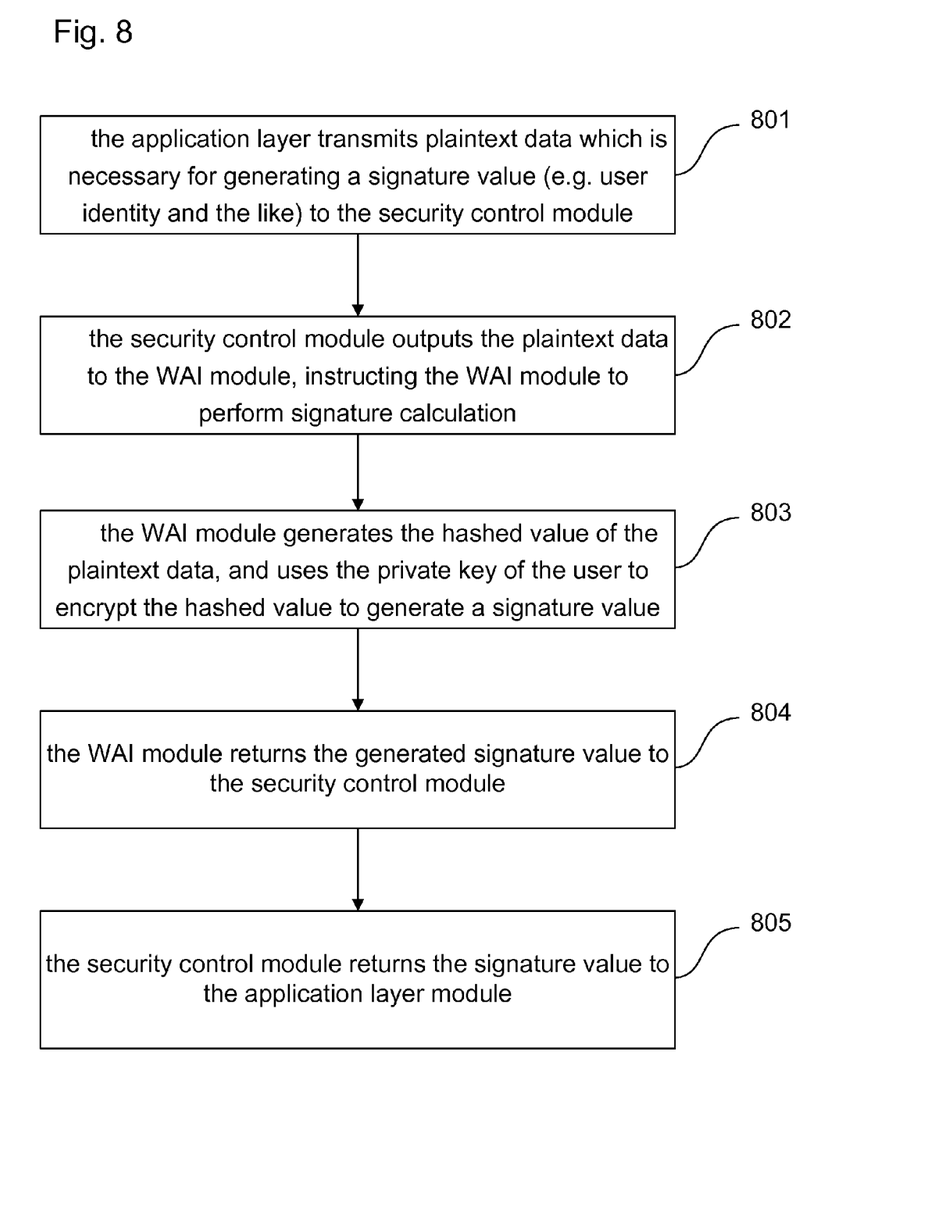
FIG. 8 shows the flow of the application layer module realizing digital signature via calling the interface of the security control module in the WLAN terminal of the present invention.

FIG. 8 shows the flow of the application layer module realizing digital signature via calling the interface of the security control module in the WLAN terminal of the present invention. As shown in FIG. 8, the method includes:

801: the application layer calls the WAPI service interface of the security control module, requests the security control module to perform a signature generation operation, and transmits plaintext data which is necessary for generating a signature value (e.g. user identity and the like) to the security control module;

802: the security control module outputs the plaintext data to the WAI module, instructing the WAI module to perform signature calculation;

803: the WAI module generates the hashed value of the plaintext data, and uses the private key of the user to encrypt the hashed value by means of asymmetric cryptographic algorithm to generate a signature value;

804: the WAI module returns the generated signature value to the security control module; and 805: the security control module returns the signature value to the application layer module.

Figure 9:
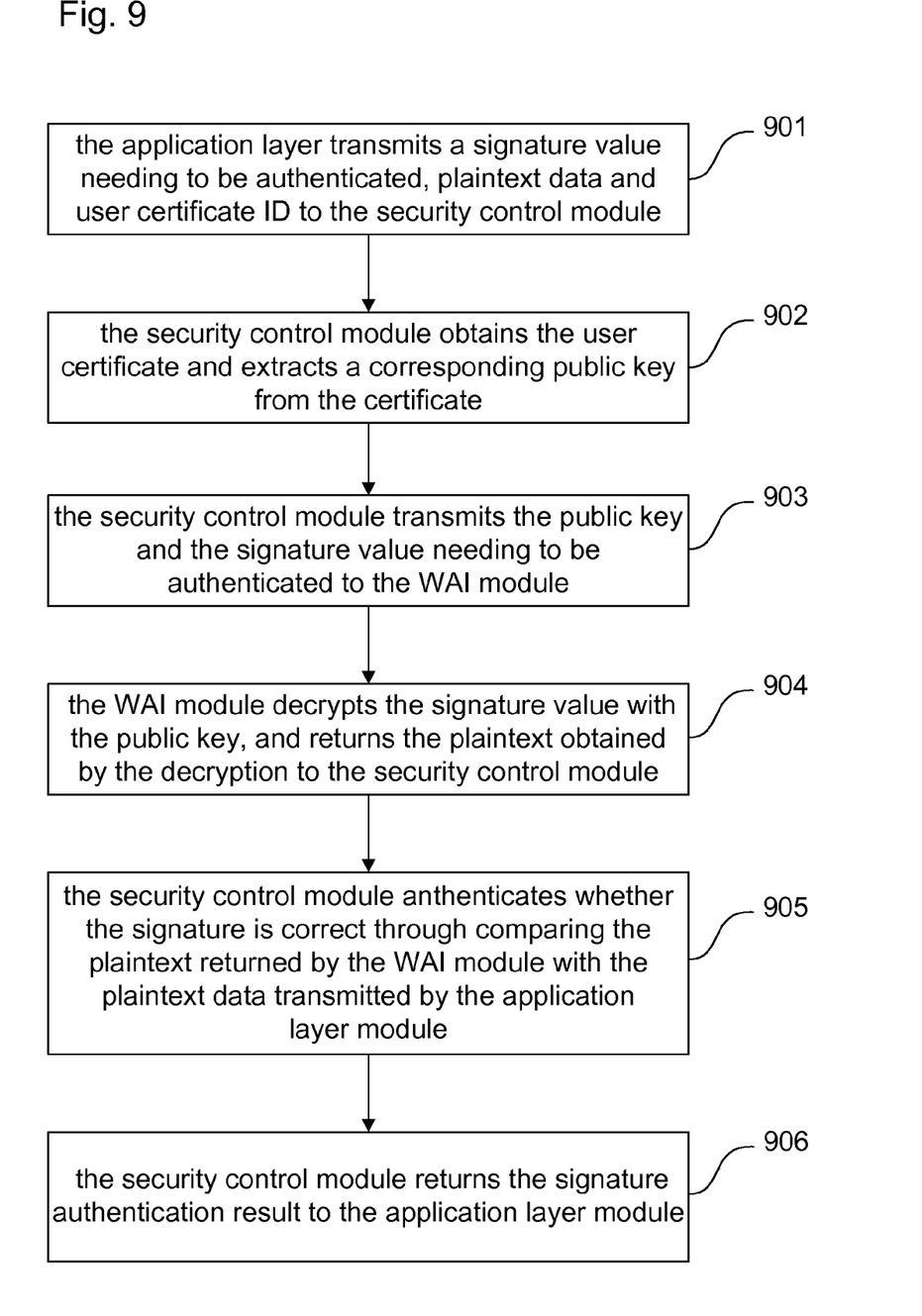
FIG. 9 shows the flow of the application layer module realizing digital signature authentication via calling the interface of the security control module in the WLAN terminal of the present invention.

FIG. 9 shows the flow of the application layer module realizing digital signature authentication via calling the interface of the security control module in the WLAN terminal of the present invention. As shown in FIG. 9, the method includes:

901: the application layer calls the WAPI service interface of the security control module, requests the security control module to perform signature authentication, and transmits a signature value needing to be authenticated, plaintext data and user certificate ID (identifier) to the security control module;

902: the security module obtains corresponding user certificate locally or from the certificate server through a network interface of a certificate management system according to the user certificate ID, and extracts a corresponding public key from the certificate;

903: the security control module transmits the public key and the signature value needing to be authenticated to the WAI module, and requests the WAI module to decrypt the signature value;

904: the WAI module decrypts the signature value with the public key to obtain plaintext corresponding to the signature value, and returns it to the security control module;

905: the security control module compares the plaintext corresponding to the signature value returned by the WAI module with the plaintext data transmitted by the application layer module, if they are the same, it indicates that the signature is correct, otherwise, it indicates that the signature is wrong; and 906: the security control module returns the signature authentication result to the application layer module.

The invention claimed is:

1. A security service control method, comprising:
    stopping a WLAN Privacy Infrastructure (WPI) service between a Wireless Local Area Network (WLAN) terminal and an Access Point (AP) when the WLAN terminal creates a security service of an Internet Protocol (IP) layer and/or a layer above the IP layer in TCP/IP model with the AP, wherein
    the WPI service comprises: encrypting a data link layer message to be transmitted, and decrypting a received data link layer message;
    and wherein executing the operation of stopping the WPI service when a security control module of the WLAN terminal receives a request of creating the security service of the IP layer and/or the layer above the IP layer transmitted by an application layer module of the WLAN terminal; and
    creating and initiating, by the security control module, the security service of the IP layer and/or the layer above the IP layer for the application layer module according to the request of creating the security service of the IP layer and/or the layer above the IP layer after the WPI service is stopped.

2. The method according to claim 1, after the WPI service is stopped, the method further comprising: when the WLAN terminal cancels the security service of the IP layer and/or the layer above the IP layer, completing, by the WLAN terminal, a disassociation procedure with the AP, a re-association procedure with the AP, a user authentication procedure with the AP and a key negotiation procedure with the AP in turn, and using a session key obtained through the key negotiation procedure to recover the WPI service.

3. The method according to claim 1, wherein the step of stopping the WPI service comprises:
    performing, by the WLAN terminal, a disassociation procedure with the WLAN AP, and performing a re-association procedure between the WLAN terminal and the AP after the disassociation procedure succeeds;
    performing a user authentication procedure between the WLAN terminal and the AP after the re-association procedure succeeds;
    after the user authentication procedure is completed and a unicast key negotiation request transmitted by the AP is received by the WLAN terminal, returning, by the WLAN terminal, a unicast key negotiation failure response to the AP; and
    stopping, by the WLAN terminal and the AP, the encryption and decryption of the data link layer message transmitted between the WLAN terminal and the AP.

4. The method according to claim 1, wherein
    only when an application of creating the security service of the IP layer and/or the layer above the IP layer is the application uniquely using WLAN for communication in the WLAN terminal, or besides the application of creating the security service of the IP layer and/or the layer above the IP layer, all other applications using the WLAN for communication in the WLAN terminal have initiated the security service of the IP layer and/or the layer above the IP layer, stopping the WPI service by the WLAN terminal.

5. A WLAN terminal, comprising: an application layer module, a WLAN Authentication Infrastructure (WAI) module and a WPI module, further comprising:
    a security control module, configured to receive a request of creating a security service of an IP layer and/or a layer above the IP layer in TCP/IP model transmitted by the application layer module, and stopping a WPI service between the WLAN terminal and a WLAN AP after receiving the request, wherein
    the WPI service comprises: encrypting a data link layer message to be transmitted, and decrypting a received data link layer message;
    and wherein the security control module is further configured to, after receiving the request of creating the security service of the IP layer and/or the layer above the IP layer, cache the request and transmitting an instruction of stopping the WPI service to the WAI module;
    the WAI module is configured to, after receiving the instruction of stopping the WPI service, stop the WPI service between the WLAN terminal and the AP and notify the security control module that the WPI service has been stopped after the WPI service is stopped; and
    the security control module is further configured to create and initiate the security service of the IP layer and/or the layer above the IP layer for the application layer module according to the cached request after receiving the notification.

6. The terminal according to claim 5, wherein
    the WAI module is further configured to, after receiving the instruction of stopping the WPI service, complete a disassociation procedure with the WLAN AP, a re-association procedure with the WLAN AP and a user authentication procedure with the WLAN AP in turn; and after receiving a unicast key negotiation request transmitted by the AP, returning a unicast key negotiation failure response to the AP and instructing the WPI module to stop encrypting and decrypting the data link layer message so as to stop the WPI service between the WLAN terminal and the AP.

7. The terminal according to claim 5, wherein
the security control module is further configured to receive a request of canceling the security service of the IP layer and/or the layer above the IP layer transmitted by the application layer module after the WPI service is stopped, and transmitting an instruction of recovering the WPI service to the WAI module after receiving the request; and
the WAI module is configured to, after receiving the instruction of recovering the WPI service, complete the disassociation procedure with the WLAN AP, the re-association procedure with the WLAN AP, the user authentication procedure with the WLAN AP and the key negotiation with the WLAN AP in turn; and after the key negotiation procedure is completed, transmit a session key obtained through the key negotiation procedure to the WPI module.

8. The terminal according to claim 6, wherein
the security control module is further configured to, after receiving the request of creating the security service of the IP layer and/or the layer above the IP layer, determine whether there is an application layer module in the WLAN terminal using WLAN for communication but not initiating the security service of the IP layer and/or the layer above the IP layer besides the application layer module transmitting the request of creating the security service of the IP layer and/or the layer above the IP layer, and transmit the instruction of stopping the WPI service only when there is no such application layer module.

9. The terminal according to claim 6, wherein
the WAI module is configured to instruct the WPI module to stop encrypting and decrypting the data link layer message by transmitting a null key to the WPI module.

10. The terminal according to claim 6, wherein
the security control module is further configured to receive a request of canceling the security service of the IP layer and/or the layer above the IP layer transmitted by the application layer module after the WPI service is stopped, and transmit an instruction of recovering the WPI service to the WAI module after receiving the request; and
the WAI module is configured to, after receiving the instruction of recovering the WPI service, complete the disassociation procedure with the WLAN AP, the re-association procedure with the WLAN AP, the user authentication procedure with the WLAN AP and the key negotiation with the WLAN AP in turn; and after the key negotiation procedure is completed, transmit a session key obtained through the key negotiation procedure to the WPI module.

* * * * *

UNITED STATES PATENT AND TRADEMARK OFFICE
CERTIFICATE OF CORRECTION

PATENT NO. : 8,724,816 B2  Page 1 of 1
APPLICATION NO. : 13/259023
DATED : May 13, 2014
INVENTOR(S) : Shi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 83 days.

Signed and Sealed this

Twenty-ninth Day of September, 2015

Michelle K. Lee
*Director of the United States Patent and Trademark Office*